Patented Sept. 9, 1952

2,610,171

UNITED STATES PATENT OFFICE 2,610,171

PREPARATION OF NONNUCLEARLY SULFONATED PHENOL-FORMALDEHYDE RESIN IN BEADED FORM

Arthur S. Nyquist, Cos Cob, Conn., assignor to American Cyanamid Company, New York, N. Y., a corporation of Maine No Drawing. Application February 17, 1949, Serial No. 77,071

8 Claims. (Cl. 260—49)

1

This invention relates to ion exchange resins and more particularly, to the production of certain cation active resins in the form of spheroidal beads.

In the past, liquid polymerizable substances such as styrene, acrylic acid esters, and the like have been polymerized in aqueous suspension to produce thermoplastic resins as granular products uniform in composition and particle size. Similarly, spheroidal particles of gels have been prepared by gelation of hydrosols in water-immiscible media. Resins of the thermosetting condensation type such as urea-formaldehyde, melamine-formaldehyde, and the like, and particularly resins of the thermosetting condensation type in a cured state such as the ion exchange resins, both anionic and cationic, have however not previously been produced in the form of spheroidal particles or beads of uniform size.

It is an object of the present invention to produce a cation exchange resin active for the removal of cations from, or the exchange of cations in, fluid media in a form which can be used directly, without grinding or screening, in ion exchange processes.

It is another object of the present invention to produce a cation exchange resin in the form of spheroidal particles.

A further object of the present invention is to provide a method for preparing a condensation type, thermosetting, synthetic resin in the form of spheroidal beads.

Still another object of the present invention is to convert a partially condensed, water-soluble resin to a cured, water-insoluble cation active resin in bead form.

It is still a further object of the present invention to prepare, in bead form, a cation exchange resin which is a condensation product of phenol and formaldehyde containing omega, i. e., nonnuclear, sulfonic acid radicals.

The above and other objects are attained by dispersing an aqueous syrup of a resinous partial condensation product of phenol, formaldehyde and a water-soluble salt of sulfurous acid in an inert organic, non-solvent medium by mechanical agitation and in the presence of a cationic surface active agent, and converting the partially condensed product of the dispersed globules thereby formed to an insoluble resin by heating.

2

The invention will be described in greater detail in conjunction with the following specific examples in which proportions are given in parts by weight. It should be understood that the examples are merely illustrative, and it is not intended that the scope of the invention be limited to the details therein set forth.

EXAMPLE 1

(1) 175 parts of resin "A" syrup
(2) 655 parts of o-dichlorbenzene
(3) 3.3 parts [0.5% based on weight of (2)] of N,N' - dioctadecyl - alpha - 2 - hydroxyethylaminosuccinamide acetate.

(2) and (3) are charged into a suitable vessel equipped with an anchor type stirrer, a water trap and means for indicating temperature. The mix is heated to 80° C. and the stirrer adjusted to 150 R. P. M., whereupon (1) is added rapidly. The resulting dispersion is heated for 0.5 hour to effect azeotropic removal of 67 parts of water, and the system is then placed under reflux and heated at 150° C. for 18 hours.

The black glossy beads obtained have the following size distribution: 6.6% on 20 mesh, 39.0% 20–40 mesh, 47.8% 40–60 mesh and 6.6% through 60 mesh.

EXAMPLE 2

Example 1 is repeated using only 2.5 parts [0.375% based on weight of (2)] of the N,N'-dioctadecyl - alpha-2-hydroxyethylaminosuccinamide acetate, azeotropically removing 71 parts of water by heating for 1.4 hours, and finally refluxing for 18 hours at 155° C.

The black lustrous beads obtained have the following size distribution: 19.8% on 20 mesh, 63.3% 20–40 mesh, 13.7% 40–60 mesh and 3.2% through 60 mesh.

Thus it will be apparent, by comparing the results of Examples 1 and 2, that use of the smaller amount of dispersing agent for the particular system in question produces more resin beads in the size range preferred for ion exchange processes.

EXAMPLE 3

(1) 175 parts of resin "A" syrup
(2) 795 parts of 1,2,4-trichlorbenzene
(3) 2 parts [0.25% based on weight of (2)] of N,N' - dioctadecyl - alpha - 2 - hydroxyethylaminosuccinamide acetate.

The procedure of Example 2 is followed except that the 71 parts of water are removed by heating for 0.8 hour. The black lustrous beads obtained have the following size distribution: 28.5% on 20 mesh, 36.5% 20–40 mesh, 13.0% 40–60 mesh and 2.0% through 60 mesh.

EXAMPLE 4

Example 3 is repeated using 0.8 part [0.1% of the weight of (2)] of the dispersing agent and removing 71 parts of water by heating for 0.6 hour. The black lustrous beads obtained have the following size distribution: 20.3% on 20 mesh, 65.5% 20–40 mesh, 14.2% 40–60 mesh and none through 60 mesh.

Comparison of Examples 3 and 4 indicates that for the particular system involved, the smaller amount of dispersing agent produces more resin beads in the size range preferred for ion exchange processes. Moreover, less dispersing agent is necessary with trichlorbenzene as the non-solvent medium than with dichlorbenzene, compare Examples 2 and 4.

EXAMPLE 5

Example 4 is repeated with 66 parts of water being removed by heating for 1.5 hours, taking care that the pot temperature does not rise above 130° C. over the first 1.25 hours.

The black lustrous beads have the following size distribution: 14.4% on 20 mesh, 75.5% 20–40 mesh, 9.2% 40–60 mesh and 0.9% through 60 mesh. The resin has a capacity of 16.8 kilograins as $CaCO_3$ per cubic foot of resin and a density of 23.9 pounds per cubic foot.

EXAMPLE 6

(1) 175 parts of resin "B" syrup
(2) 805 parts tetrachlorethane
(3) 1.6 parts [0.2% of the weight of (2)] of N,N'-dioctadecyl-alpha-2-hydroxyethylaminosuccinamide acetate.

The procedure of Example 1 is followed except that the mix is refluxed for 0.5 hour prior to removal of 73 parts of water by heating for 0.8 hour. The resin is then cured by heating at 141° C. for 6 hours.

Orange, translucent beads of resin having a capacity of 14.7 kilograins as $CaCO_3$ per cubic foot of resin and a density of 22.4 pounds per cubic foot are obtained. The orange color is believed to be due to the bleaching action of $SO_2$ probably liberated by the action of unreacted bisulfite in the resin syrup and free hydrochloric acid formed by slow hydrolysis of the tetrachlorethane.

EXAMPLE 7

(1) 175 parts of resin "A" syrup (specific gravity 1.3)
(2) 45.9 parts of o-dichlorobenzene
   59 parts of toluene  (specific gravity 1.27)
(3) 5.2 parts [1% of weight of (2)] of N,N'-dioctadecyl-alpha-2-hydroxyethylaminosuccinamide acetate.

The procedure of Example 1 is followed with a 560 R. P. M. rate of agitation, 62.5 parts of water being removed by heating for 0.7 hour and the resin being cured by refluxing for 8 hours at 150° C. A brick red powder is obtained, the range of particle size being from 3–150 microns and the bulk of the particles falling within the size range of 30–60 microns.

EXAMPLE 8

(1) 100 parts of resin "C" syrup
(2) 300 parts of xylene
(3) 3 parts [1% of weight of (2)] of N,N'-dioctadecyl-alpha-2-hydroxyethylaminosuccinamide acetate.

(2) and (3) are charged into a suitable vessel as in Example 1; the mix is heated to 65° C. and the stirrer adjusted at 500–600 R. P. M. (1) is then added rapidly. The resulting dispersion is heated to effect azeotropic removal of 39 parts of water and then further heated at 140°–145° C. for 2.5 hours.

Spheroidal black resin beads are obtained which are dry screened and evaluated as follows:

| Distribution, Mesh Size | Capacity, kilograins as $CaCO_3$ per cubic foot of resin | Density, lbs. per cubic foot of resin |
| --- | --- | --- |
| 20–40 | 13.6 | 15.8 |
| 40–60 | 18.1 | 16.7 |
| through 60 | 20.3 | 17.0 |

Similar results are obtained when the N,N'-dioctadecyl-alpha-2-hydroxyethylaminosuccinamide acetate used in Examples 1–8 is replaced by stearyldimethyl-benzylammonium chloride.

Preparation of resin "A" syrup 94 parts (1.0 mol) of phenol
31.6 parts (0.25 mol) of anhydrous sodium sulfite
27.4 parts (0.25 mol) of 95% sodium bisulfite
203.0 parts (2.5 mols) of 37% formaldehyde The above ingredients are brought together with cooling until the exothermic reaction subsides. The reaction mixture is then heated for 1.5 hours at 90–95° C., after which the resulting syrup is heated for 0.5 hour with steam. The viscosity of the resulting syrup is about 10 poises as determined by a No. 30 Ostwald viscosimeter.

Preparation of resin "B" syrup

The procedure for the preparation of resin "A" syrup is followed except that the syrup is heated with steam for 0.75 hour. The viscosity of the resulting syrup, similarly measured, is 18.3 poises.

Preparation of resin "C" syrup

The procedure for the preparation of resin "A" syrup is followed except that the reaction mixture is heated with steam for 2.5 hours instead of 1.5 hours and, as a result, the resin syrup obtained is extremely viscous.

Preparation of N,N'-dioctadecyl-alpha-2-hydroxyethylaminosuccinamide acetate (1) 635 parts of dimethyl maleate (4.41 mols)
(2) 284 parts of ethanolamine 95% (4.41 mols)
(3) 2395 parts of octadecylamine (8.82 mols +)
(4) 1558 parts of tert. butanol
(5) 265 parts of acetic acid (4.41 mols)

(1), (2) and (4) are mixed together and heated under reflux by means of steam for 16 hours. (4) is then distilled off under reduced pressure up to a residue temperature of 60–70° C. at about 100 mm.

(3) is then added, and the mixture is heated at 90–100° C. for 24 hours with occasional agitation. The methanol formed in the reaction is distilled off until the residual product reaches a temperature of 100° C. at 10–20 mm. pressure. (5) is then added with thorough stirring and a homogeneous paste which is dispersible in water is obtained.

Cation active synthetic resin to which the process of the present invention is applicable are, in general, those described in U. S. Patent No.

2,228,159 and U. S. application, Serial No. 712,741 filed November 27, 1946. Specifically, sulfited formaldehyde condensation products of phenol, naphthalene or alpha-methylnaphthalene, i. e., those condensation products which contain omega sulfonic acid groups, may be used if they have a sufficiently rapid rate of gelation for bear formation. When the gelation rate is too slow, the resin globules agglomerate before they become hardened by gel formation. Similarly, beaded resins which are condensation products of isopropylidene di(p-phenol) and formaldehyde containing non-nuclear sulfonic acid groups or of 4,4'-dihydroxydiphenylsulfone and formaldehyde containing non-nuclear sulfonic acid groups, as described in U. S. application Serial No. 676,096 filed June 11, 1946 and U. S. application Serial No. 694,817 filed September 4, 1946, respectively, may be prepared by my process.

Cationic hydroxyalkyl amine salts containing a long chain (8–18 carbons) alkyl group and quaternary ammonium salts containing a long chain (8–18 carbons) alkyl group generally are useful as the surface active agent in the present process. Examples of such salts, in addition to the N,N' - dioctadecyl - alpha - 2-hydroxyethylaminosuccinamide acetate of the specific examples, include the compounds described in Patent No. 2,418,652 as, for example, the malate of the condensation product of a mixture of palmitic and stearic acids with ethanol and ethylene diamine, stearyldimethylbenzylammonium chloride ("Triton K–60"), cetyltrimethylammonium bromide, alkyl pyridinium salts such as cetyl pyridinium bromide and cetyl pyridinium chloride, N(acyl colamino formyl-methyl) pyridinium chlorides ("Emulsept"), gamma-stearamidopropyldimethyl - beta - hydroxyethylammonium chloride, the ethylene oxide addition products thereof, gamma-stearamidopropyldimethylglycerylammonium chloride, the compounds disclosed in U. S. Patent No. 2,268,395, and the like.

The optimum amount of cationic amine or quaternary ammonium salt used will vary depending upon the rate and type of agitation, the non-solvent medium and particularly its density, the resin dispersant and particularly its viscosity, the desired bead size, etc. For example, with trichlorbenzene as the non-solvent and a low rate of agitation, i. e., of the order of 150 R. P. M., about 0.1%, based on the weight of non-solvent, of N,N'-dioctadecyl - alpha-2-hydroxyethylaminosuccinamide acetate represents the optimum quantity for production of beads having a size distribution suitable for use in ion exchange processes. On the other hand, if dichlorbenzene is used as the non-solvent, about 0.375%, based on the weight of non-solvent, of the surface active agent is desirable. The minimum quantity of dispersing agent for any particular system is that amount which will keep the resin dispersed in the non-solvent medium; the maximum quantity is dependent upon the size of beads desired since, in general, the larger the quantity of the dispersing agent, the smaller the bead. In general, I use from about 0.005% to about 3%, based on the weight of non-solvent medium, of surface active agent.

Organic non-solvent media which may be used in the practice of the process of the present invention must be liquid at room temperature, insoluble in water, stable toward heat (up to about 90°–160° C.), not readily hydrolyzable, and inert, i. e., non-reactive with formaldehyde, phenol or sulfiting agent or with condensation products thereof. In addition they should preferably boil above about 120° C. and have specific gravities substantially equivalent to those of the resin syrups, generally from about 1.1 to 1.5. The non-solvent media may each consist of a single compound, or they may be mixtures of two or more compounds if the properties of the combination fit the necessary qualifications. Thus, while a single chlorinated hydrocarbon solvent, the preferred embodiment of the present invention, is used in each of Examples 1–6, Example 7 makes use of a mixture of a chlorinated hydrocarbon and toluene which mixture has a proper specific gravity, boiling point, and other necessary properties.

Following are some non-solvent media which may advantageously be used in the process of the present invention.

|  | Boiling Point, °C. | Specific Gravity |
| --- | --- | --- |
| trimethylenedichloride | 123–5 | 1.201 |
| o-dichlorbenzene | 179 | 1.305 |
| 1,2,4-trichlorbenzene | 213 | 1.446 |
| 3,3'-dichlorodi-n-propyl ether | 215 | 1.140 |
| sym. dichlorethyl ether | 178.5 | 1.222 |
| 2,2-dichlorethanol-1 | 146 | 1.145 |
| nitrobenzene | 211 | 1.205 |
| o-nitroethylbenzene | 227 | 1.126 |
| o-nitrophenetol | 275 | 1.199 |
| o-nitrotoluene | 223 | 1.163 |
| 1,2-dimethyl-3-nitrobenzene | 240 | 1.147 |
| p-fluorochlorobenzene | 130 | 1.226 |
| fluoronaphthalene | 212 | 1.133 |
| 1-bromohexane | 156 | 1.173 |
| 1-bromoctane | 188 | 1.099 |
| diphenyl ether | 235 (60 mm.) | 1.205 |

Non-solvent media of higher than the preferred specific gravity may be diluted with less dense liquids such as toluene and/or xylene until the specific gravity of the combination is substantially equivalent to that of the resin syrup (see Example 7) and then used satisfactorily in the present process. A few of these media of higher specific gravity are

|  | Boiling Point, °C. | Specific Gravity |
| --- | --- | --- |
| sym. tetrachlorethane | 146.3 | 1.600 |
| sym. tetrabromethane | 151 (54 mm.) | 2.964 |
| 1,1,2-tribromethane | 188 | 2.579 |

Furthermore, non-solvent media of lower than the preferred specific gravity may also be used if other variables of the system in question are modified to counteract the effect of the density differential between the resin and the non-solvent therefor. Such variables include, for example, the efficiency (rate and type) of agitation which should be stepped up and the viscosity of the resin syrup which should, if possible, be heavier, see Example 8. Preferred media of lower specific gravity include

|  | Boiling Point, °C. | Specific Gravity |
| --- | --- | --- |
| o-xylene | 144 | 0.881 |
| m-xylene | 139.3 | 0.867 |
| p-xylene | 138.5 | 0.861 |
| 1,2,3-trimethylbenzene | 176.1 | 0.894 |
| 1,2,4-trimethylbenzene | 169.3 | 0.876 |
| 1,3,5-trimethylbenzene | 164.8 | 0.865 |
| ethyl benzene | 136.2 | 0.867 |
| isopropylbenzene | 152.5 | 0.862 |
| p-cymene | 176–7 | 0.857 |

In the event that an extremely inert non-solvent medium is required, suitable liquids include xylene hexafluoride, xylene hexachloride, toluene trifluoride, those fluorcarbons and fluorochlorocarbons having the necessary boiling point and specific gravity, mixtures of these inert media with each other and with other media mentioned above as suitable.

The mechanical agitation taking place during the process of the present invention is very important. The degree and type of agitation must be sufficient to keep the dispersion from coagulating but it has a variable upper limit depending upon the size of beads desired and the practicality of producing them. With an anchor type stirrer, as used in the examples, a speed of from about 100-200 R. P. M. is generally preferred for the production of resin beads within a range suitable for use in ion-exchange processes, i. e., from about 8-60 mesh, wet screen, on a standard U. S. Sieve Series (U. S. Bureau of Standards, Standard Screen Series, 1919). However, the speed can go as high as about 600 R. P. M., in which case a much smaller bead is formed from a comparable resin syrup. Furthermore, in many cases variable speed agitation is desirable, gel formation being effected at relatively low speed followed by increased speed to prevent agglomeration of the dispersed particles during the cure. Impeller, impeller-baffle, turbine and other type agitating means may be substituted for the anchor type of the examples.

When extremely small or micro beads are desired, as for medicinal ion exchange application, a high agitation rate with relatively large amounts of surface active agent are desirable factors. In addition, as the rate of agitation is increased, the viscosity of the resin solution may need to be increased in order for bead formation to take place.

The success of my process appears to depend at least in part on the establishment, under any given set of conditions, of an interfacial tension in the resin-medium system which is within a definite range conducive to the formation of spheroidal particles. My process is specific to the particular type surface active agent claimed, however, since not all surface active agents which produce an interfacial tension within the predetermined range will necessarily work. I have found that the cationic hydroxyalkyl amine salts and the quaternary ammonium salts disclosed in the present application are suitable for use in the preparation of phenol-formaldehyde condensation products containing omega sulfonic acid groups in spheroidal form according to the present process.

It is necessary, according to the process of the present invention, to remove at least a portion of the water from the dispersed resin syrup in order for the resin to gel since the phenol-bisulfite-formaldehyde condensation products are relatively slow to gel, and removal of water increases the reflux temperature, thereby causing gelation. Once gelation has occurred the resin beads are cured by heating at from about 90°-160° C., the preferred curing temperature falling between about 120°-150° C. During this heating, which may be carried out in the presence of the non-solvent medium or which may be carried out after separation of the gelled beads from the medium in a suitable oven, at least 1.25 hours before heating to 150° C.

The process of the present invention may be applied to the preparation of dyes, pigments, catalysts and ionic or non-ionic resinous materials in the form of spheroidal or micro-spheroidal particles which, because of their spheroidal nature, possess certain advantages over the corresponding granular products.

Similar process applied to other type resins and/or other type surface active agents are described and claimed in the copending applications of Lennart A. Lundberg identified below:

| Serial No. | Filing Date | Title |
|---|---|---|
| 77,070 | Febuary 17, 1949 | Preparation of Nuclearly Sulfonated Phenol-Formaldehyde Resin in Bead Form. |
| 77,068 | February 17, 1949 | Use of Cationic Surface Active Agent in Preparation of Anionic Resin in Bead Form. |
| 77,069 | February 17, 1949 | Use of Non-Ionic Surface Active Agent in Preparation of Anionic Resin in Bead Form. |
| 77,067 | February 17, 1949 | Use of Petroleum Sulfonates in Preparation of Resinous Condensation Products in Bead Form. |

I claim:
1. A process which comprises dispersing an aqueous syrup of a partially condensed resin capable of being cured to a water-insoluble product which is a condensation product of phenol and formaldehyde containing omega sulfonic acid groups, in an inert, organic non-solvent liquid which has a boiling point of at least 120° C. and the density of which is substantially equivalent to that of said aqueous resin syrup, by mechanical agitation in the presence of a cationic surface active agent selected from the group consisting of quaternary ammonium salts containing an alkyl group of from 8 to 18 carbon atoms and hydroxyalkyl amine salts containing an alkyl group of from 8 to 18 carbon atoms, heating the dispersion azeotropically to remove water from the dispersed resin globules until the temperature of gelation of the resin is attained, and finally curing the gelled resin globules obtained by heating, sufficient agitation being provided throughout the heating to prevent coagulation of the dispersed globules.

2. A process in accordance with claim 1 in which the non-solvent liquid is a chlorinated hydrocarbon.

3. A process in accordance with claim 1 in which the surface active agent is N,N'-dioctadecyl-alpha-2-hydroxyethylaminosuccinamide acetate.

4. A process in accordance with claim 1 in which the non-solvent liquid is a chlorinated hydrocarbon and the surface active agent is N,N'-dioctadecyl-alpha-2-hydroxyethylaminosuccinamide acetate.

5. A process in accordance with claim 1 in which the surface active agent is a quaternary ammonium salt containing an alkyl group of from 8 to 18 carbon atoms.

6. A process in accordance with claim 1 in which the surface active agent is a hydroxyalkyl amine salt containing an alkyl group of from 8 to 18 carbon atoms.

7. A process in accordance with claim 1 in which curing is effected by refluxing the gelled resin beads in the presence of the non-solvent liquid.

8. A process in accordance with claim 1 in which the gelled resin beads are separated from the non-solvent liquid and then cured by heating in an oven.

ARTHUR S. NYQUIST.

REFERENCES CITED

The following references are of record in the file of this patent:

UNITED STATES PATENTS

| Number | Name | Date |
|---|---|---|
| 2,228,159 | Wessenegger et al. | Jan. 7, 1941 |
| 2,518,420 | Evers | Aug. 8, 1950 |

FOREIGN PATENTS

| Number | Country | Date |
|---|---|---|
| 585,538 | Great Britain | Feb. 11, 1947 |